Patented Nov. 25, 1930

1,782,887

UNITED STATES PATENT OFFICE

LAURIE LORNE BURGESS, OF CAMBRIDGE, MASSACHUSETTS, ASSIGNOR TO PLASTIC, INC., OF KEENE, NEW HAMPSHIRE, A CORPORATION OF NEW HAMPSHIRE

PROCESS OF PRODUCING COMPOSITIONS CONTAINING COMPOUNDS OF ALGINIC ACID AND PRODUCT THEREOF

No Drawing.  Application filed July 14, 1928. Serial No. 292,905.

My invention relates particularly to a process of producing compositions obtained by treating alginic acid with a hydrocarbon, the same containing soluble, as well as insoluble materials formed as the result of the reaction between the alginic acid and the hydrocarbon.

The object of my invention is to obtain compositions which are of an insoluble character, but which may contain, also, some soluble constituents formed by the reaction of alginic acid upon a hydrocarbon, as, for example, paraffin wax. Further objects of my invention will appear from the detailed description of the same hereinafter.

While my invention is capable of being carried out in many different ways, for the purpose of illustration I shall describe only certain ways of carrying out the same hereinafter.

In general, my invention may be carried out by heating alginic acid, or compositions containing the same, dissolved in an alkaline reagent, such as ammonium hydrate or soda ash or sodium hydroxide, etc., with hydrocarbon dissolved in a suitable solvent, such, for example, as carbon tetrachloride. During the heating it is best, but not essential, to agitate the charge during the reaction period. After the interaction of the constituents, precipitation may be effected therein by adding a mineral acid, such as hydrochloric or sulphuric acid, after which the precipitate may be filtered, washed and dried. This dried precipitate may be then extracted with carbon tetrachloride, thus separating the material into two portions, that is to say, the portion which dissolves in carbon tetrachloride and the residue. The residue is a dark colored substance which may be plasticized by the addition of ammonium hydrate and a suitable oxide so as to become insolubilized thereby, for example, by the addition of lime or zinc oxide or cupric oxide, and then molded into any desired shape. The articles thus obtained will be found to have great resistance to water, and are very hard and tough.

When a finely divided metal, such as copper, zinc, etc., is added to the original mixture at the time of the reaction between the hydrocarbon and the alginic acid, the mass precipitates of its own accord after the reaction has proceeded for several hours. The resulting mass may then be filtered off, washed and dried, and then extracted with carbon tetrachloride. The residue obtained may then be plasticized by ammonium hydrate and molded into any desired form. The resultant product has good water resistance and is harder and tougher than the material obtained without the addition of the metal. However, the material obtained as a residue, by distilling off the carbon tetrachloride from the liquid extracted with the carbon tetrachloride, appears to be substantially the same as in the case of the material obtained as described above in the process in which no metal has been added.

For example, in carrying out my invention I may proceed as follows:

Example 1

An alginic acid jelly is prepared by breaking down a sea growth containing alginic acid, as, for example, Laminaria, in the presence of an alkali, such, for example, as sodium hydroxide, soda ash. This may be accomplished by treating 10 kilograms of Laminaria, which may or may not have been previously dried, with 0.2 kilograms of soda ash in the presence of 15 liters of water. This action is allowed to continue for a period of 5 hours. The algulose which has not become dissolved may then be removed by decantation or otherwise. The liquid thus obtained is then precipitated by the addition of 400 cc. of a dilute mineral acid (N/1), such, for example, as hydrochloric acid or sulphuric acid. This produces as a precipitate, an alginic acid jelly containing in the jelly a considerable amount of water.

285 grams of the alginic acid jelly containing 15 grams of dry solid are dissolved in 10 cc. of concentrated ammonia and 200 cc. of water. 25 grams of paraffin wax and 50 cc. of carbon tetrachloride are then added, the paraffin having been previously dissolved in the carbon tetrachloride. The whole mass is then heated in a flask having a reflux condenser attached thereto. The flask is agitated for approximately 10 hours, while maintaining a temperature of 80 to 90° C. The contents are then precipitated by adding 60 cc. of a 10% solution of a hydrochloric acid, and the precipitate is filtered, washed and dried. The cake thus obtained is broken up and extracted with carbon tetrachloride in a soxhlet extractor for a period of from 2 to 3 hours. The solution thus obtained is separated by distilling off the carbon tetrachloride therefrom.

Example 2

285 grams of the alginic acid jelly obtained as above described, and containing 15 grams of dry solid, is dissolved in 10 cc. of concentrated ammonia and 250 cc. of water. 15 grams of paraffin wax dissolved in 25 cc. of carbon tetrachloride are then added, as well as 5 grams of zinc dust. The charge is then heated at 80 to 90° C. in a flask provided with an agitator and reflux condenser, for approximately 16 hours. The product is then filtered off, washed and dried. The product thus obtained may be extracted with carbon tetrachloride and the solid obtained from the solution by distilling off the carbon tetrachloride exactly as above described.

Instead of starting with the alginic acid jelly as described in the above examples, I may start directly with the kelp itself, as set forth in the following example:

Example 3

300 grams of kelp (Laminaria) containing 30 grams of solid is dissolved in 10 cc. of ammonia and 300 cc. of water. 15 grams of paraffin wax, dissolved in 40 cc. of carbon tetrachloride are then added as well as 3 grams of copper powder. The change is then heated at 80°-90° C. in a flask provided with an agitator and a reflux condenser, for approximately 15 hours. The product is then filtered off, washed and dried. The product thus obtained may be extracted with carbon tetrachloride and the solid obtained from the solution by distilling off the carbon tetrachloride exactly as above described.

The residue left after the extraction with carbon tetrachloride in all of the above examples may then be plasticized by adding to 20 grams of the said residue 20 cc. of concentrated ammonium hydrate, to which may be added a compound of a metal in order to render the resulting product completely insoluble, as, for example 1 gram of slack lime, or 1.5 grams of zinc oxide, or 1.5 grams of cupric oxide. The material may then be molded into any desired shape, and will be found to have great water resistance and to be quite hard and tough. In the case where the finely divided metal has been added to the reaction mixture it is found that the product obtained is harder and tougher than in the case where the finely divided metal has not been added.

It will be understood that the conditions of operation, and the proportions above referred to may be varied within wide limits. Also, in the case of the paraffin wax other hydrocarbons may be substituted, as for example, vaseline, so called heavy hydrocarbons, etc. Also, in place of the Laminaria I may use any other sea growth containing alginic acid. Also, in place of the ammonia or ammonium hydrate I may use other alkaline reagents, such as soda ash, sodium hydroxide, potassium hydroxide, etc.

In the above products there are evidently found to be one or more compounds resulting from a reaction between the alginic acid and the hydrocarbon. In the case of paraffin wax there are present, undoubtedly, a number of hydrocarbons, and it may be, also, that the alginic acid itself is a mixture of acids. At least some of the said compound formed by the action of the alginic acid upon the hydrocarbons is present in the final residue obtained as above described.

While I have described my invention above in detail I wish it to be understood that many changes may be made therein without departing from the spirit of the same.

I claim:

1. The process which comprises forming an insoluble product by the reaction of alginic acid upon a hydrocarbon and then plasticizing the product by the addition of an alkali.

2. The process which comprises forming an insoluble product by the reaction of alginic acid upon a hydrocarbon and then plasticizing the product by the addition of ammonia.

3. The process which comprises forming an insoluble product by the reaction of alginic acid upon a hydrocarbon, extracting the product with a solvent, and then plasticizing the product by the addition of an alkali.

4. The process which comprises forming an insoluble product by the reaction of alginic acid upon a hydrocarbon, extracting the product with a solvent, and then plasticizing the product by the addition of ammonia.

5. The process which comprises forming an insoluble product by the reaction of alginic acid upon a hydrocarbon and then plasticizing the product by the addition of an alkali in the presence of a metal compound adapted to react with the alginate present to form an insoluble material.

6. The process which comprises forming an insoluble product by the reaction of alginic acid upon a hydrocarbon and then plasticizing the product by the addition of ammonia in the presence of a metal compound adapted to react with the alginate present to form an insoluble material.

7. The process which comprises forming an insoluble product by the reaction of alginic acid upon a hydrocarbon, extracting the product with a solvent, and then plasticizing the product by the addition of an alkali in the presence of a metal compound adapted to react with the alginate present to form an insoluble material.

8. The process which comprises forming an insoluble product by the reaction of alginic acid upon a hydrocarbon, extracting the product with a solvent, and then plasticizing the product by the addition of ammonia in the presence of a metal compound adapted to react with the alginate present to form an insoluble material.

9. The process which comprises forming an insoluble product by the reaction of alginic acid upon paraffin wax and then plasticizing the product by the addition of an alkali.

10. The process which comprises forming an insoluble product by the reaction of alginic acid upon paraffin wax and then plasticizing the product by the addition of ammonia.

11. The process which comprises forming an insoluble product by the reaction of alginic acid upon paraffin wax, extracting the product with a solvent, and then plasticizing the product by the addition of an alkali.

12. The process which comprises forming an insoluble product by the reaction of alginic acid upon paraffin wax, extracting the product with a solvent, and then plasticizing the product by the addition of ammonia.

13. The process which comprises forming an insoluble product by the reaction of alginic acid upon a hydrocarbon in the presence of a finely divided metal, and then plasticizing the product by the addition of an alkali.

14. The process which comprises forming an insoluble product by the reaction of alginic acid upon a hydrocarbon in the presence of a finely divided metal, and then plasticizing the product by the addition of ammonia.

15. The process which comprises forming an insoluble product by the reaction of alginic acid upon a hydrocarbon in the presence of a finely divided metal, extracting the product with a solvent, and then plasticizing the product by the addition of an alkali.

16. The process which comprises forming an insoluble product by the reaction of alginic acid upon a hydrocarbon in the presence of a finely divided metal, extracting the product with a solvent, and then plasticizing the product by the addition of ammonia.

17. A product comprising a reaction product of alginic acid and a hydrocarbon from which soluble constituents have been partly removed.

18. A product comprising a reaction product of alginic acid and paraffin wax from which soluble constituents have been partly removed.

19. A product comprising a reaction product of alginic acid and a hydrocarbon from which soluble constituents have been partly removed, the same having been combined with a metal base.

20. A product comprising a reaction product of alginic acid and paraffin wax from which soluble constituents have been partly removed, the same having been combined with a metal base.

21. A product comprising a reaction product of alginic acid and a hydrocarbon from which soluble constituents have been partly removed, and containing a finely divided metal.

22. A product comprising a reaction product of alginic acid and paraffin wax from which soluble constituents have been partly removed, and containing a finely divided metal.

23. A product comprising a reaction product of alginic acid and a hydrocarbon from which soluble constituents have been partly removed, the same having been combined with a metal base, and containing a finely divided metal.

24. A product comprising a reaction product of alginic acid and paraffin wax from which soluble constituents have been partly removed, the same having been combined with a metal base, and containing a finely divided metal.

In testimony that I claim the foregoing, I have hereunto set my hand this 21st day of June, 1928.

LAURIE L. BURGESS.